(12) United States Patent
Didehban et al.

(10) Patent No.: US 11,449,380 B2
(45) Date of Patent: Sep. 20, 2022

(54) METHOD FOR DETECTING AND RECOVERY FROM SOFT ERRORS IN A COMPUTING DEVICE

(71) Applicants: Moslem Didehban, Tempe, AZ (US); Aviral Shrivastava, Phoenix, AZ (US); Sai Ram Dheeraj Lokam, Chandler, AZ (US)

(72) Inventors: Moslem Didehban, Tempe, AZ (US); Aviral Shrivastava, Phoenix, AZ (US); Sai Ram Dheeraj Lokam, Chandler, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 685 days.

(21) Appl. No.: 16/420,364

(22) Filed: May 23, 2019

(65) Prior Publication Data

US 2019/0378542 A1 Dec. 12, 2019

Related U.S. Application Data

(60) Provisional application No. 62/681,129, filed on Jun. 6, 2018.

(51) Int. Cl.
*G06F 11/07* (2006.01)

(52) U.S. Cl.
CPC ........ *G06F 11/079* (2013.01); *G06F 11/0706* (2013.01); *G06F 11/0793* (2013.01)

(58) Field of Classification Search
CPC ............... G06F 9/3861; G06F 11/0706; G06F 11/0721; G06F 11/0724; G06F 11/0793; G06F 11/3624
See application file for complete search history.

(56) References Cited

U.S. PATENT DOCUMENTS

| 8,234,489 B2 | 7/2012 | Williamson et al. |
| 8,769,498 B2 | 7/2014 | Burghard et al. |

(Continued)

OTHER PUBLICATIONS

Non-Final Office Action for U.S. Appl. No. 16/227,514, dated Oct. 7, 2020, 14 pages.

(Continued)

*Primary Examiner* — Joseph R Kudirka
(74) *Attorney, Agent, or Firm* — Withrow + Terranova, P.L.L.C.

(57) ABSTRACT

A method for detecting and recovery from a soft error in a computing device is provided. In examples discussed herein, the method can be performed to detect soft errors that may occur during execution of a predefined critical instruction(s) and/or has been propagated in the computing device prior to the execution of the predefined critical instruction(s). Specifically, a software compiler may be used to embed an error detector block(s) after the predefined critical instruction(s). In this regard, the error detector block(s) can be executed after the predefined critical instruction(s) to detect the soft error. Accordingly, it may be possible to invoke a diagnosis routine to determine severity of the detected soft error and take appropriate action against the detected soft error. As such, it may be possible to protect the execution of the predefined critical instruction(s) concurrent to eliminating vulnerable voting intervals and reducing soft error detection overhead.

22 Claims, 7 Drawing Sheets

(56) References Cited

U.S. PATENT DOCUMENTS

| | | | |
|---|---|---|---|
| 8,966,455 B2 | 2/2015 | Abadi et al. | |
| 9,015,689 B2 | 4/2015 | Bai et al. | |
| 9,513,886 B2 | 12/2016 | Bai et al. | |
| 9,836,354 B1 * | 12/2017 | Potlapally | G06F 11/1484 |
| 10,296,312 B2 | 5/2019 | Shrivastava et al. | |
| 10,437,256 B2 | 10/2019 | Andert et al. | |
| 2006/0026343 A1 | 2/2006 | Wu et al. | |
| 2006/0179346 A1 | 8/2006 | Bishop et al. | |
| 2010/0042875 A1 | 2/2010 | Grodnik et al. | |
| 2010/0077164 A1 | 3/2010 | Stiffler et al. | |
| 2010/0231944 A1 | 9/2010 | Takahashi | |
| 2011/0016338 A1 | 1/2011 | Williamson et al. | |
| 2011/0107166 A1 | 5/2011 | Flautner et al. | |
| 2012/0005461 A1 | 1/2012 | Moir et al. | |
| 2012/0221884 A1 | 8/2012 | Carter et al. | |
| 2013/0031364 A1 | 1/2013 | Glew et al. | |
| 2013/0103989 A1 | 4/2013 | Jensen | |
| 2013/0205413 A1 | 8/2013 | Grocutt et al. | |
| 2013/0275806 A1 | 10/2013 | Busaba et al. | |
| 2014/0189310 A1 | 7/2014 | Tuck et al. | |
| 2015/0007142 A1 | 1/2015 | Biffle et al. | |
| 2015/0186251 A1 | 7/2015 | Friedler et al. | |
| 2015/0213260 A1 | 7/2015 | Park | |
| 2016/0092225 A1 | 3/2016 | Collura et al. | |
| 2016/0170725 A1 | 6/2016 | Holton et al. | |
| 2016/0246602 A1 | 8/2016 | Radhika et al. | |
| 2017/0235580 A1 | 8/2017 | Knauth et al. | |
| 2018/0004946 A1 | 1/2018 | LeMay et al. | |
| 2019/0073225 A1 | 3/2019 | Mace et al. | |
| 2019/0196912 A1 | 6/2019 | Didehban et al. | |

OTHER PUBLICATIONS

U.S. Appl. No. 16/172,254.
U.S. Appl. No. 16/568,074.
Author Unknown, "International Technology Roadmap For Semiconductors 2.0," Executive Summary, 2015, ITRS, 79 pages.
Aupy, Guillame, et al., "On the Combination of Silent Error Detection and Checkpointing," Pacific Rim International Symposium on Dependable Computing, Dec. 2013, IEEE, 10 pages.
Barhorst, James, et al., "A Research Agenda for Mixed-Criticality Systems," Cyber-Physical Systems, Apr. 2009, 26 pages.
Bell, Gordon, et al., "Characterization of Silent Stores," International Conference on Parallel Architectures and Compilation Techniques, Oct. 2000, IEEE, pp. 133-142.
Blinkert, Nathan, et al., "The gem5 simulator," ACM SIGARCH Computer Architecture News, vol. 39, Issue 2, May 2011, 7 pages.
Chang, Jonathan, et al., "Automatic Instruction-Level Software-Only Recovery," International Conference on Dependable Systems and Networks, Jun. 2006, IEEE, 10 pages.
Didehban, Moslem, et al., "A Compiler technique for near Zero Silent Data Corruption," Design Automotion Conference, vol. 53, Jun. 2016, ACM, 7 pages.
Didehban, Moslem, et al., "InCheck: An In-application Recovery Scheme for Soft Errors," Design Automation Conference, Jun. 2017, ACM, 6 pages.
Dong, Xiangyu, et al., "A Case Study of Incremental and Background Hybrid In-Memory Checkpointing," Exascale Evaluation and Research Techniques Workshop, vol. 115, Mar. 2010, 8 pages.
Duell, Jason. "The Design and Implementation of Berkeley Lab's Linux Checkpoint/Restart," Lab Technical Report, Lawrence Berkeley National Laboratory, Apr. 2005, 17 pages.
Elnozahy, Elmootazbellah, et al., "Checkpointing for Peta-Scale Systems: A Look into the Future of Practical Rollback-Recovery," IEEE Transactions on Dependable and Secure Computing, vol. 1, Issue 2, Apr. 2004, pp. 97-108.
Feng, Shugang, et al., "Encore: Low-Cost, Fine-Grained Transient Fault Recovery," International Symposium on Microarchitecture, Dec. 2011, IEEE, 12 pages.
Feng, Shugang, et al., "Shoestring: Probabilistic Soft Error Reliability on the Cheap," Architectural Support for Programming Languages and Operating Systems, Mar. 13-17, 2000, Pittsburgh, Pennsylvania, ACM, 12 pages.

Guthaus, Matthew, et al., "MiBench: A free, commercially representative embedded benchmark suite," International Workshop on Workload Characterization, Dec. 2001, IEEE, 12 pages.
Kuvaiskii, Dmitrii, et al., "ELZAR: Triple Modular Redundancy using Intel AVX," Practical Experience Report, International Conference on Dependable Systems and Networks, Jun. 2016, IEEE, pp. 646-653.
Laguna, Ignacio, et al., "IPAS: Intelligent Protection Against Silent Output Corruption in Scientific Applications," In CGO, Mar. 2016, ACM, pp. 227-238.
Lattner, Chris, et al., "LLVM: A Compilation Framework for Lifelong Program Analysis & Transformation," International Symposium on Code Generation and Optimization, Mar. 2004, 11 pages.
Leveugle, Regis, et al., "Statistical Fault Injection: Quantified Error and Confidence," Design, Automation & Test in Europe Conference & Exhibition, Apr. 2009, IEEE, 5 pages.
Liu, Qingrui, et al., "Clover: Compiler Directed Lightweight Soft Error Resilience," Conference on Languages, Compilers and Tools for Embedded Systems, Jun. 2015, ACM, 10 pages.
Liu, Qingrui, et al., "Compiler-Directed Lightweight Checkpointing for Fine-Grained Guaranteed Soft Error Recovery," International Conference for High Performance Computing, Networking, Storage and Analysis, Nov. 2016, IEEE, 12 pages.
Lu, Guoming, et al., "When is Multi-version Checkpointing Needed?," 3rd Workshop on Fault-Tolerance for HPC at Extreme Scale, Jun. 2013, ACM, 8 pages.
Mitropoulou, Konstantina, et al., "DRIFT: Decoupled CompileR-Based Instruction-Level Fault-Tolerance," International Workshop on Languages and Compilers for Parallel Computing, Oct. 2014, Springer International Publishing, 17 pages.
Oh, Nahmsuk, et al. "ED4I: Error Detection by Diverse Data and Duplicated Instructions," IEEE Transactions on Computers, vol. 51, Issue 2, Feb. 2002, pp. 180-199.
Quinn, Heather, et al., "Software Resilience and the Effectiveness of Software Mitigation in Microcontrollers," IEEE Transactions on Nuclear Science, vol. 62, Issue 6, Dec. 2015, pp. 2532-2538.
Reis, George, et al., "SWIFT: Software Implemented Fault Tolerance," International Symposium on Code Generation and Optimization, Mar. 2005, IEEE, 12 pages.
Reis, George, et al., "Automatic instruction-level software-only recovery," MICRO, vol. 27, Issue 1, Jan. 2007, IEEE, pp. 36-47.
Restrepo-Calle, Felipe, et al., "Selective SWIFT-R," Journal of Electronic Testing, vol. 29, Issue 6, Dec. 2013, 15 pages.
Schirmeier, Horst, et al., "Avoiding Pitfalls in Fault-Injection Based Comparison of Program Susceptibility to Soft Errors," International Conference on Dependable Systems and Networks, 2015, IEEE, pp. 319-330.
Schroeder, Bianca, et al., "Understanding Failures in Petascale Computers," Journal of Physics, Conference Series, vol. 78, 2007, IOP Publishing Ltd, 11 pages.
Shrivastava, Aviral, et al., "Quantitative Analysis of Control Flow Checking Mechanisms for Soft Errors," Design Automation Conference, Jun. 2014, IEEE, 6 pages.
Shye, et al., "PLR: A Software Approach to Transient Fault Tolerance for Multicore Architectures," IEEE Transactions on Dependable and Secure Computing, vol. 6, Issue 2, Apr. 2009, pp. 135-148.
Sierawski, Brian, et al., "Effects of Scaling on Muon-Induced Soft Errors," International Reliability Physics Symposium, Apr. 2011, IEEE, 6 pages.
Silberberg, Rein, et al., "Neutron Generated Single-Event Upsets in the Atmosphere," IEEE Transactions on Nuclear Science, vol. NS-31, Issue 6, Dec. 1984, pp. 1183-1185.
Spainhower, L., et al., "IBM S/390: Parallel Enterprise Server G5 fault tolerance: A historical perspective," Journal of Research and Development, vol. 43, Issue 5.6, Sep. 1999, IBM, 8 pages.
Taber, A., et al., "Single Event Upset in Avionics," Transactions on Nuclear Science, vol. 40, Issue 2, Apr. 1993, IEEE, pp. 120-126.
Ulbrich, et al., "Eliminating Single Points of Failure in Software-Based Redundancy," Ninth European Dependable Computing Conference, 2012, IEEE, pp. 49-60.
Vemu, Ramtilak, et al., "CEDA: Control-Flow Error Detection Using Assertions," IEEE Transactions on Computers, vol. 60, Issue 9, Sep. 2011, pp. 1233-1245.

(56) References Cited

OTHER PUBLICATIONS

Wang, et al., "Compiler-Managed Software-based Redundant Multi-Threading for Transient Fault Detection," International Symposium on Code Generation and Optimization, 2007, IEEE, 13 pages.
Xu, Jianjun, et al., "An Instruction-level Fine-grained Recovery Approach for Soft Errors," Symposium on Applied Computing, Mar. 2013, ACM, pp. 1511-1516.
Yim, Keun Soo, et al., "A Fault-Tolerant Programmable Voter for Software-Based N-Modular Redundancy," IEEE Aerospace Conference, 2012, IEEE, 20 pages.
Yu, Jing, et al., "ESoftcheck: Removal of Non-vital Checks for Fault Tolerance,", International Symposium on Code Generation and Optimization, Mar. 2009, IEEE, 12 pages.
Zhang, Yun, et al., "DAFT: Decoupled Acyclic Fault Tolerance," Proceedings of the International Conference on Parallel Architectures and Compilation Techniques, Sep. 11-15, 2010, Vienna, Austria, ACM, 11 pages.
Zhang, Ying, et al., "Fault Recovery Based on Checkpointing for Hard Real-Time Embedded Systems," International Symposium on Defect and Fault Tolerance in VLSI Systems, 2003, IEEE, 8 pages.
Zhang, Yun, et al., "Runtime Asynchronous Fault Tolerance via Speculation," International Symposium on Code Generation and Optimization, Mar. 2012, ACM, 10 pages.
U.S. Appl. No. 16/694,451.
Notice of Allowance for U.S. Appl. No. 16/227,514, dated Jan. 6, 2021, 10 pages.

\* cited by examiner

METHOD FOR DETECTING AND RECOVERY FROM SOFT ERRORS IN A COMPUTING DEVICE

RELATED APPLICATIONS

This application claims the benefit of provisional patent application Ser. No. 62/681,129, filed Jun. 6, 2018, the disclosure of which is hereby incorporated herein by reference in its entirety.

GOVERNMENT SUPPORT

This invention was made with government support under 1055094 awarded by the National Science Foundation. The government has certain rights in the invention.

FIELD OF THE DISCLOSURE

The technology of the disclosure relates generally to a method for detecting a soft error in a computing device.

BACKGROUND

The ever-increasing use of digital systems in everyday life has made reliability a key factor in modern computing devices such as microprocessors. Soft errors caused by high-energy particles, power supply noises, transistor variability, and so on can modify a logic value stored in a microprocessor memory element(s) and cause timing and/or functional failure. Historically, soft errors were considered a challenge for high-altitude applications because most of the high-energy particles can get cascaded by Earth's atmosphere before reaching ground level. However, as International Technology Roadmap for Semiconductors (ITRS) 2015 predicts, even terrestrial level muon-induced particles can cause soft errors in the microprocessors. Software-level soft error tolerant schemes may be preferred over hardware-based solutions because software-level soft error tolerant schemes can be selectively applied on commercial off-the-shelf processors—either to a safety/mission critical application(s) or to a critical part(s) of an application.

Redundancy-based techniques may have been considered the most effective soft error protection schemes. Depending on recovery strategy, existing software fault tolerant schemes can be categorized into backward and forward recovery schemes. Many schemes have been developed only for error detection. There are two main kinds of backward-recovery techniques, namely restart and checkpointing-and-rollback. The restart-based recovery techniques may be useful for some small applications, but can be less effective for hard real-time, long-running, and interactive applications. Checkpointing may solve the problems of global restarting by periodically saving a snapshot of the programs architectural state and memory and register state (checkpoint). In case of an error, the program rolls back to the last saved checkpoint and re-executes the instructions from the checkpoint. However, a software-based full checkpoint scheme may suffer from latent error problems (e.g., errors that happen before a checkpoint and are detected long after the checkpoints) and may introduce significant performance overhead. Although an idempotent-based checkpoint/recovery technique proposed by some researchers may be capable for low-latency error detection scheme and provide efficient recovery, the idempotent-based checkpoint/recovery technique may suffer from restricted recovery capability. For example, it can be difficult for the idempotent-based checkpoint/recovery technique to recover from errors that can affect an address of a memory write instruction, transform an opcode of an instruction to memory write operation, or alter a control flow of a program.

In contrast to the backward recovery, forward recovery schemes do not implicitly detect errors. Instead, the forward recovery schemes mask errors by applying majority-voting between redundantly-computed results. A coarse-grain forward recovery scheme may perform infrequent voting on system-call arguments but may be unable to provide protection in cases where a pointer is in the list of system call arguments. This is because the coarse-grain forward recovery scheme verifies correctness of redundant computed pointers, but not data that is actually stored into the memory. On the other hand, fine-grain forward recovery schemes perform voting operations on some specific points of execution and can get the best from Error Correcting Code (ECC)-protected components like cache/memory subsystem. For instance, Swift-R triplicates the arithmetic/logical instructions in a program and performs 2-of-3 majority-voting for register operands of critical instructions (e.g., memory and control flow instructions).

However, detailed analysis of Swift-R based techniques reveals that such schemes have quite restricted error coverage. The main reason is that the always-on voting is based on voting of the operands before all critical instructions. Such always-on voting may cause two main problems. First, the critical instructions are executed only one time, and therefore are vulnerable. If any error occurs during the execution of critical instructions it may remain undetected, and therefore unrecovered. Second, frequent voting operations may introduce vulnerable intervals for the operands of critical instructions and impose significant performance overhead. Hence, it may be desired to further optimize the existing forward recovery schemes to overcome the above-mentioned shortcomings.

SUMMARY

Aspects disclosed in the detailed description relate to a method for detecting and recovery from soft errors in a computing device. In examples discussed herein, the method can be performed to detect a soft error that may occur during execution of a predefined critical instruction(s) (e.g., a memory write instruction, a flow control instruction, etc.) and/or has been propagated in the computing device prior to the execution of the predefined critical instruction(s). Specifically, a software compiler may be used to embed an error detector block(s) after the predefined critical instruction(s). In this regard, the error detector block(s) can be executed after the predefined critical instruction(s) to detect the soft error. Accordingly, it may be possible to invoke a diagnosis routine to determine severity of the detected soft error and take appropriate action against the detected soft error. As such, it may be possible to protect the execution of the predefined critical instruction(s) concurrent to eliminating vulnerable voting intervals and reducing soft error detection overhead.

In one aspect, a method for detecting and recovery from soft errors in a computing device is provided. The method includes executing a predefined critical instruction. The method also includes executing an error detector block subsequent to executing the predefined critical instruction to detect a soft error occurring during execution of the predefined critical instruction. The method also includes invoking a diagnosis routine in response to detecting the soft error.

In another aspect, a non-transitory computer-readable medium (CRM) is provided. The non-transitory CRM includes software with instructions configured to execute a predefined critical instruction. The non-transitory CRM also includes software with instructions configured to execute an error detector block subsequent to executing the predefined critical instruction to detect a soft error occurring during execution of the predefined critical instruction. The non-transitory CRM also includes software with instructions configured to invoke a diagnosis routine in response to detecting the soft error.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 2:
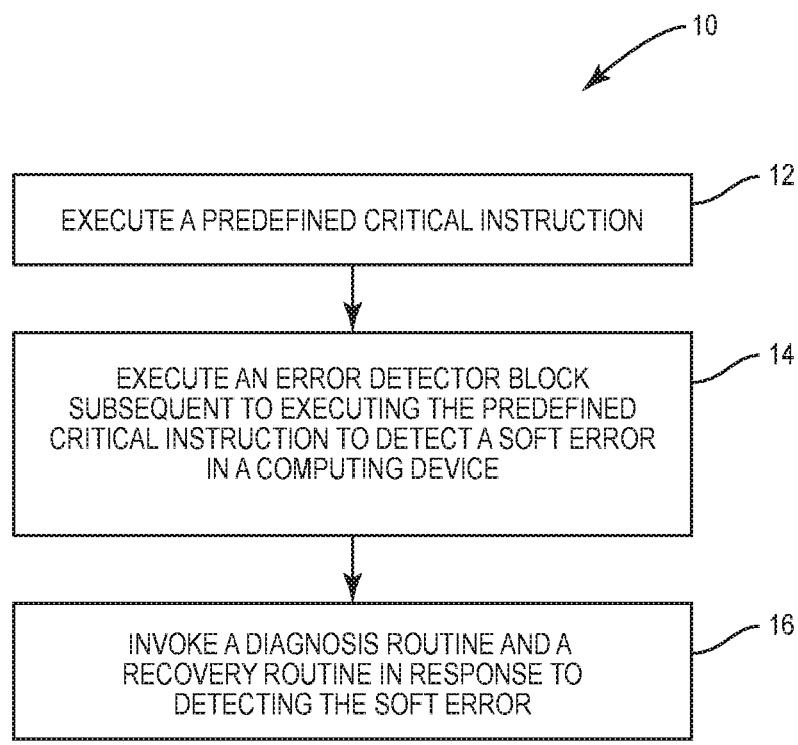
FIG. 2 is a flowchart of an exemplary process that can be employed to detect and recover from a soft error in a computing device.
Figure 6:
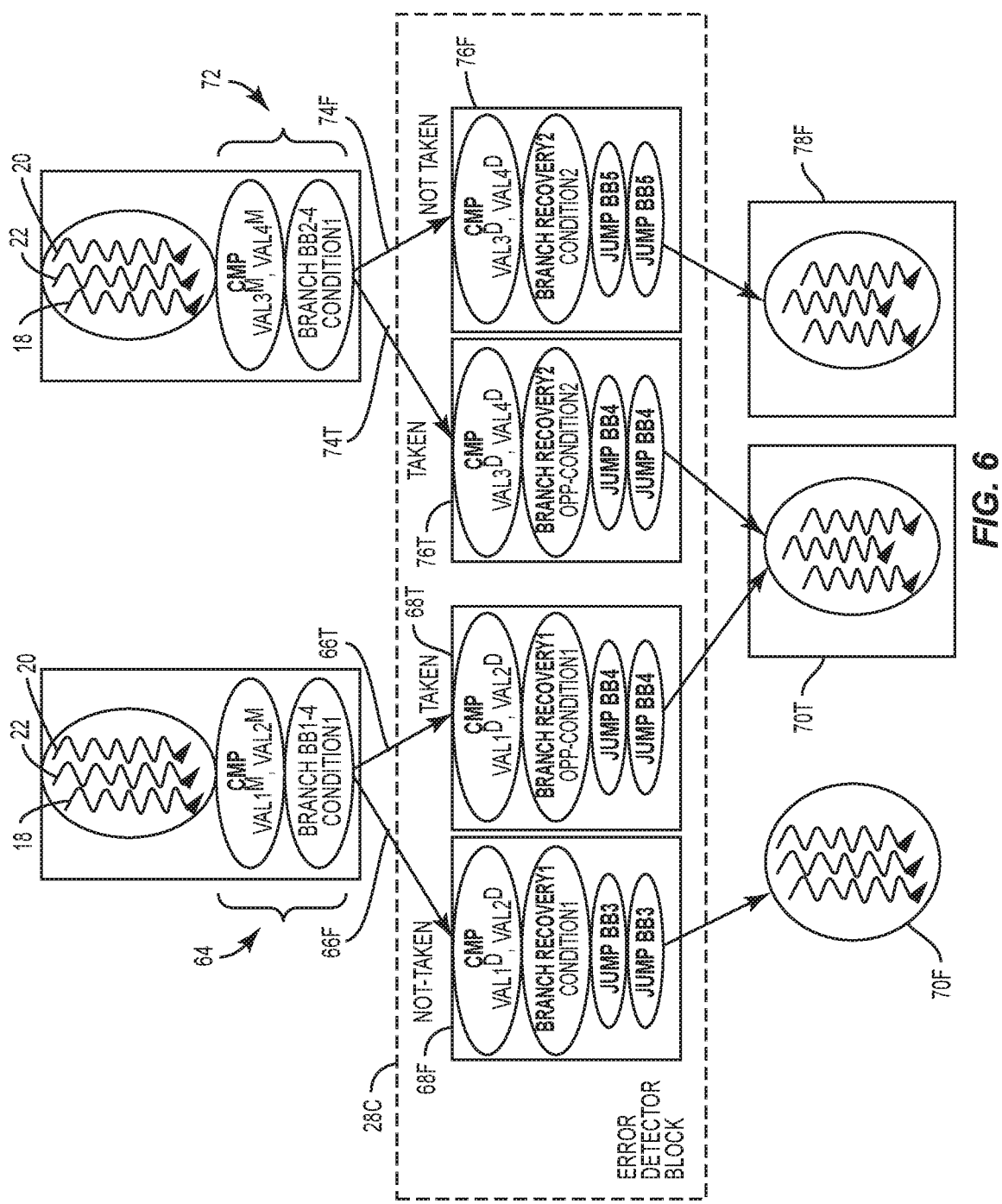
Figure 7:
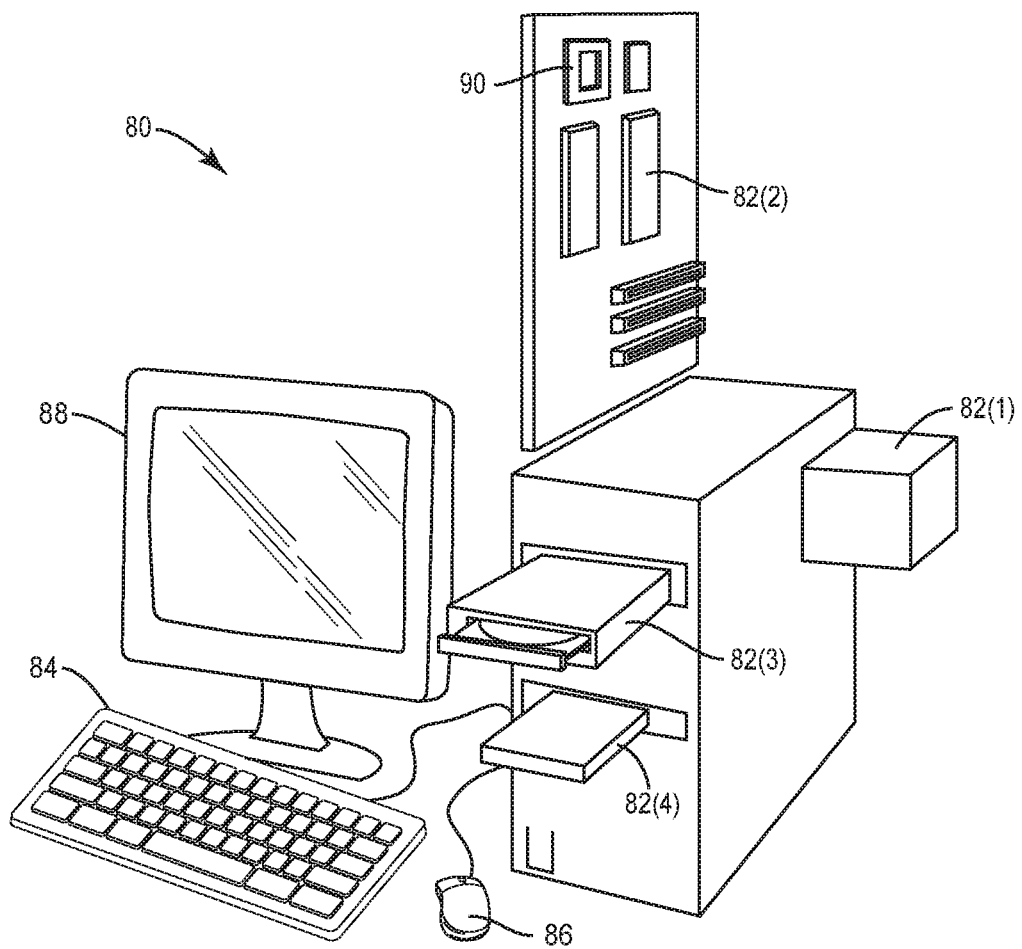

FIG. 6 is a schematic diagram providing an exemplary illustration of the method of FIG. 2 configured to detect a wrong-direction control flow error associated with execution of a flow control instruction; and FIG. 7 is a schematic diagram of an exemplary computer system including one or more non-transitory computer-readable media for storing software instructions to implement the process of FIG. 2.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description relate to a method for detecting and recovery from soft errors in a computing device. In examples discussed herein, the method can be performed to detect a soft error that may occur during execution of a predefined critical instruction(s) (e.g., a memory write instruction, a flow control instruction, etc.) and/or has been propagated in the computing device prior to the execution of the predefined critical instruction(s). Specifically, a software compiler may be used to embed an error detector block(s) after the predefined critical instruction(s). In this regard, the error detector block(s) can be executed after the predefined critical instruction(s) to detect the soft error. Accordingly, it may be possible to invoke a diagnosis routine to determine severity of the detected soft error and take appropriate action against the detected soft error. As such, it may be possible to protect the execution of the predefined critical instruction(s) concurrent to eliminating vulnerable voting intervals and reducing soft error detection overhead.

Figure 1:
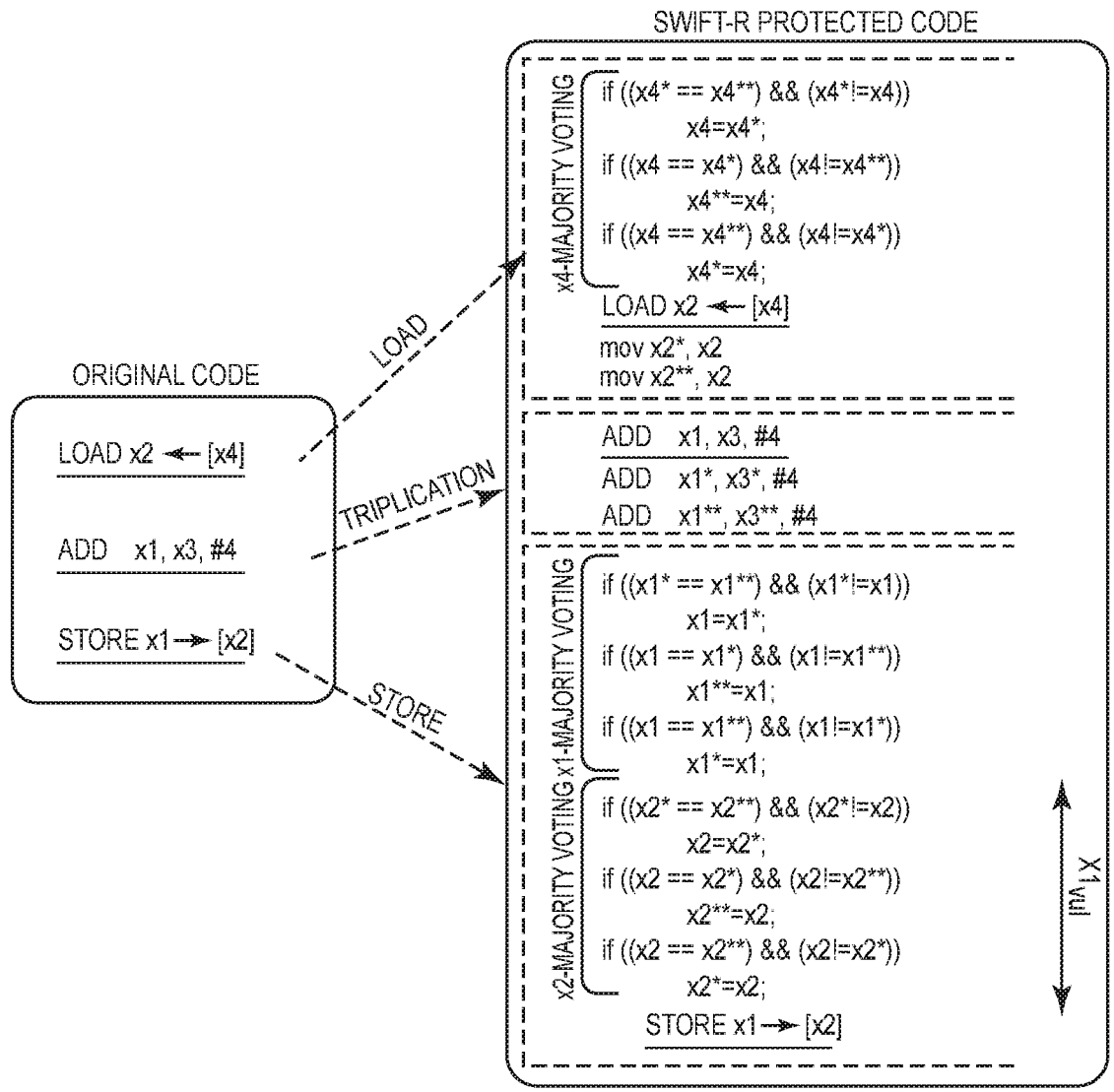
FIG. 1 is a schematic diagram providing an exemplary illustration of Swift-R transformation for a simple piece of code.

Before discussing the method of the present disclosure, a brief overview of an existing fine-grain forward recovery scheme known as Swift-R is first provided with reference to FIG. 1 to help understand the limitations of the Swift-R scheme. The discussion of specific exemplary aspects of a method for detecting a soft error in a computing device according to the present disclosure starts below with reference to FIG. 2.

In this regard, FIG. 1 is a schematic diagram providing an exemplary illustration of Swift-R transformation for a simple piece of code. Swift-R is a fine-grain forward error recovery technique, which divides programmer-visible registers into three sets and triplicates computational instructions. In an attempt to prevent propagation of soft errors to a memory subsystem, Swift-R performs 2-of-3 majority-voting between redundantly computed values of source register operands of memory and compare instructions, just before execution of the instructions.

As shown in FIG. 1, majority-voting is performed between the redundantly-computed values of load address registers before execution (marked as x4-majority-voting). The loaded value (x2) is then copied into the corresponding redundant registers (x2* and x2**). The add instruction is triplicated with redundant registers. Before the execution of a store instruction, two majority-voting operations, one for a store value register (x1) (marked as x1-majority-voting) and one for a store address register (x2) (marked as x2-majority-voting), are performed.

Notably, the Swift-R transformation may have some noticeable shortcomings. First, execution of critical instructions, which accounts for 45% of overall program operations, may not be protected. Although Swift-R majority-voting operations may eliminate effects of soft errors that may incur during execution of computational instructions (e.g., arithmetic instruction), Swift-R may be inefficient in terms of eliminating soft errors occurring during execution of memory write instructions (e.g., store instruction) and control-flow instructions (e.g., branch instruction). For example, if the soft error occurs in a pipeline that registers during execution of the load instruction, the effective address of the load instruction may be modified to an arbitrary value, thus causing a wrong value being loaded into the x2 register. Consequently, Swift-R may copy the erroneous value into the corresponding redundant registers (x2*, and x2**), making the state of all three registers consistently wrong. These types of errors may lead to a failure in Swift-R protected programs. The same problem can happen during the execution of all critical instructions that are executed only once (e.g., store, compare, and branch instructions) and Swift-R scheme does not verify whether the execution of these critical instructions is completed correctly. On average, about 55% of dynamic instructions are arithmetic instructions, and can be triplicated and protected by Swift-R. However, the remaining 45% of the instructions can be critical instructions, which the Swift-R transformation may be unable to protect.

Second, the majority-voting operation performed by the Swift-R transformation may introduce vulnerability as well. Software implementation of the majority-voting operation requires several compare and branch instructions (as shown in x1-majority-voting and x2-majority-voting in FIG. 1) and may require 4 to 10 machine instructions to complete. As such, the frequent majority-voting operation performed by the Swift-R transformation can introduce unprotected intervals even for operands of critical instructions. Particularly, if soft error happens on registers that are carrying the operands of the critical instructions, it may cause the critical instructions to execute incorrectly even after checking the operands. For example, if an error happens on the register x1 after the last access by x1-majority-voting operation and before being accessed by the store instruction, the wrong value may be written into the correct memory location. This vulnerable period is marked by a x1_vul vertical line in FIG. 1. Impact from the unprotected intervals can be significant, depending on length of the vulnerability window and the frequency of the majority-voting operation. Hence, it may be desired to overcome the above shortcomings of the Swift-R transformation when protecting the critical instructions from the impact of soft errors.

In this regard, FIG. 2 is a flowchart of an exemplary process 10 that may be employed in a computing device (e.g., a microprocessor) for detecting and recovery from a soft error that may occur during or prior to execution of a predefined critical instruction. For example, the soft error may have occurred elsewhere in the computing device and propagated to the execution of the predefined critical instruction. In a non-limiting example, the predefined critical instruction can include a memory-write (e.g., store) instruction and a flow control instruction (e.g., branch). In another non-limiting example, a software compiler can be executed to generate an executable program that includes the predefined critical instruction, the error detector block, the diagnosis routine, and a recovery routine. Specifically, the software compiler may be configured (e.g., via compiler input parameters) to detect the predefined critical instruction among a number of pipeline instructions and always embed the error detector block immediately after the predefined critical instruction in the executable program. Notably, the software compiler may be configured to embed a respective error detector block after each predefined critical instruction among the pipeline instructions.

As such, when the executable program is executed, the predefined critical instruction can be executed (block 12). Immediately after execution of the critical instruction, the error detector block is executed to detect a soft error(s) (block 14). If the error detector block detects the soft error, the diagnosis routine and the recovery routine will be invoked to react to the detected soft error (block 16).

In a non-limiting example, the diagnosis routine can be configured to first determine whether the detected soft error is recoverable. If the detected soft error is determined to be a recoverable soft error, the diagnosis routine may invoke the recovery routine to recover the detected soft error. Otherwise, the diagnosis routine may alert the detected soft error (e.g., generating an error message) and abort the executable program.

Figure 3:
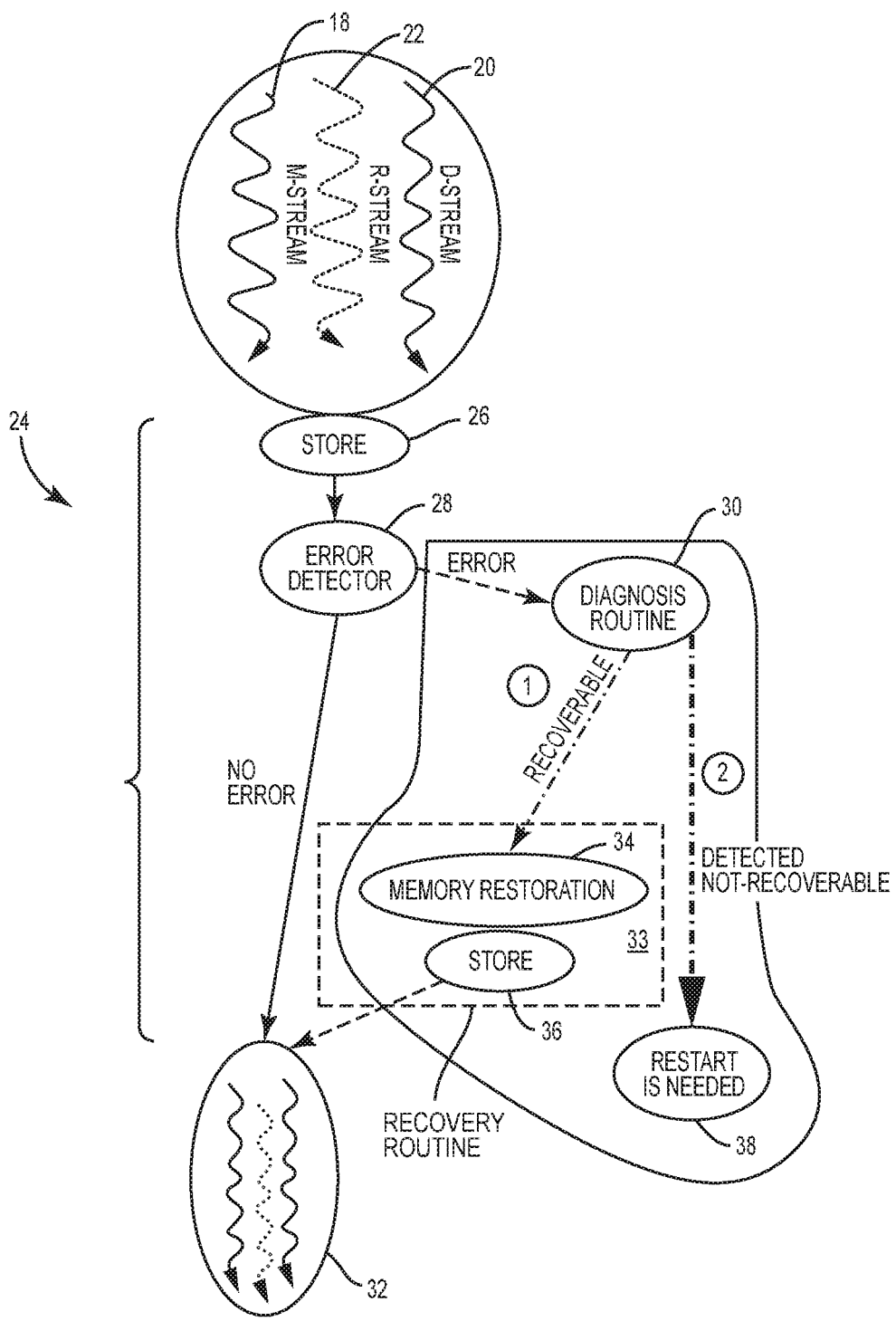
FIG. 3 is a schematic diagram providing an exemplary illustration of the method of FIG. 2 for detecting a soft error that may occur during execution of a memory write instruction.

FIG. 3 is a schematic diagram providing an exemplary illustration of the process 10 of FIG. 2 for detecting a soft error that may occur during execution of a memory write instruction. The computing device, in which the process 10 is executed for detecting soft errors, may include a number of programmer-accessible registers (not shown) that can be manipulated in a program via such instructions as load, move, copy, shift, add, and so on. The software compiler may be configured (e.g., via compiler input parameters) to partition the programmer-accessible registers into at least one master register $R^M$, at least one detection register $R^D$, and at least one recovery register $R^R$. Accordingly, the software compiler may be configured to generate the error detector block that includes a master instruction sequence 18 (also referred to as "M-Stream"), a detection instruction sequence 20 (also referred to as "D-Stream") succeeding the master instruction sequence 18, and a recovery instruction sequence 22 (also referred to as "R-Stream") succeeding the detection instruction sequence 20. In this regard, when the error detector block is executed, the master instruction sequence 18 will be executed first, the detection instruction sequence 20 will be executed after execution of the master instruction sequence 18, and the recovery instruction sequence 22 will be executed after execution of the detection instruction sequence 20.

The master instruction sequence 18 may include one or more master instructions configured to operate exclusively on the master register $R^M$. The detection instruction sequence 20 may include one or more detection instructions configured to operate exclusively on the detection register $R^D$ and the recovery instruction sequence 22 may include one or more recovery instructions configured to operate exclusively on the recovery register $R^R$. In a non-limiting example, the master instruction sequence 18 can be configured to include all executable instructions, such as arithmetic instruction (e.g., add), memory read instruction (e.g., load), flow control instruction (e.g., branch), memory write instruction (e.g., store), and functional call instruction (e.g., jump). The detection instruction sequence 20 can be configured to include a subset of the instructions involved in the master instruction sequence 18, namely the arithmetic instruction, the memory read instruction, and the flow control instruction. The recovery instruction sequence 22 can be configured to include a subset of the instructions involved in the detection instruction sequence 20, namely the arithmetic instruction and the memory read instruction.

In a non-limiting example, the master register $R^M$ is configured to carry out each of the master instructions in the master instruction sequence 18. The detection register $R^D$ is mainly used to compare with values in the master register $R^M$ to help detect the soft error. The recovery register $R^R$, on the other hand, is only used to determine recoverability of the detected soft error (e.g., via majority-voting).

As mentioned earlier, the software compiler may be executed with proper input parameters to generate an executable program 24 that includes a memory write instruction 26 (the predefined critical instruction, denoted as "store"), an error detector block 28 (denoted as "error detector"), and a diagnosis routine 30.

After executing the memory write instruction 26, the error detector block 28 is executed to determine whether a soft error has occurred during execution of the memory write instruction. If the error detector block 28 does not detect the soft error, then the executable program will proceed to executing the next instruction 32. In case the error detector block 28 detects the soft error, the executable program will proceed to the diagnosis routine 30, which determines whether the detected soft error is recoverable.

The diagnosis routine 30 may be configured to determine recoverability of the detected soft error by performing a majority-vote among the master register $R^M$, the detection register $R^D$, and the recovery register $R^R$. In a non-limiting example, the diagnosis routine 30 can conclude that the detected soft error is recoverable if at least two of the master register $R^M$, the detection register $R^D$, and the recovery register $R^R$ contain identical value. In contrast, the diagnosis routine 30 may conclude that the detected soft error is non-recoverable if respective values of the master register $R^M$, the detection register $R^D$, and the recovery register $R^R$ are distinct.

If the diagnosis routine 30 determines that the detected soft error is recoverable, the executable program 24 proceeds to a recovery routine 33 for memory restoration (block 34) and then re-execution of the memory write instruction (block 36). In this regard, the steps in blocks 34 and 36 may be performed as part of the recovery routine 33. In case the diagnosis routine 30 determines that the detected soft error is non-recoverable, the diagnosis routine 30 may generate an alert (e.g., error message) indicative of the non-recoverable soft error. Subsequently, the diagnosis routine 30 may cause the executable program to be aborted or restarted (block 38).

Notably, the process 10 of FIG. 2 assumes that the caches and memories are Error Correcting Code (ECC)-protected. As such, the sphere of protection of the error detector block 28 may only include the entire microprocessor core components (excluding memory subsystem). The objective of the process 10 is to detect and correct the effect of all transient faults and prevent the executable program from experiencing any form of function and timing failures.

The sphere of protection of the error detector block 28 includes all program instructions. The error detector block 28 checks for errors in the outcome of the predefined critical instruction, such as flow control (e.g., branch) and memory write (e.g., store) instructions, rather than register operands of the predefined critical instruction. As a result, it may be possible to enhance the coverage of voting-based schemes from just triplicated instructions to all instructions in the executable program 24.

In addition, the process 10 may close all known software vulnerability windows as identified earlier in the Swift-R scheme. Software vulnerability window, defined as the duration between checking a value in software and the time to use the value, exists in almost all existing software-level techniques. The software vulnerability window can be a major source of failure in voting-based techniques like Swift-R. Instead of voting, the process 10 is configured to check for errors in execution results of the critical instruction 26. Since the error detector block 28 is placed after execution of the memory write instruction 26, it may be possible to preserve the value inside each memory location for recovery purposes. Such lazy error checking strategy eliminates all software vulnerable windows.

Figure 4:
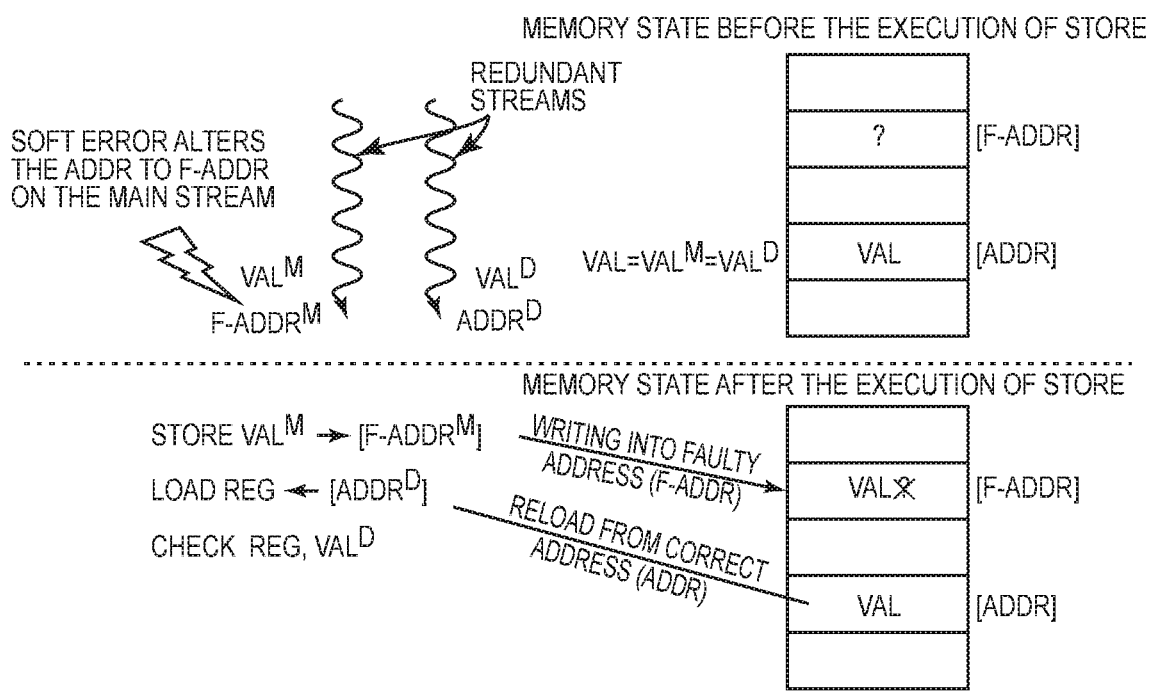
FIG. 4 is a schematic diagram providing an exemplary illustration of a silent-store error that may occur during execution of a memory write instruction.

The error detector block 28 may be particularly effective in detecting a so-called silent-store error during execution of the memory write instruction 26. FIG. 4 is a schematic diagram providing an exemplary illustration of a silent-store error, which may occur during execution of a memory write instruction.

The memory write (e.g., store) instruction is said to be silent if the memory write instruction writes a value into a memory element already holding the same value. If an error alters the effective address of a silent store, it can make a random modification to the state of memory and the error may be detected by load back strategy because the loaded value from the memory is the same as the stored value. The store is silent because the value val at a memory location addr, before executing a store instruction (as shown in the upper part of FIG. 4) is equal to the values $val^M$ and $val^D$ computed by the master instruction sequence (M-Stream) and the detection instruction sequence (D-Stream), respectively. Therefore, the state of memory should not get changed by the execution of the memory write instruction. If the soft error hits the base address register of the memory write instruction, and alters the effective address of the memory write instruction from addr to f-addr, then the memory write instruction may write data into the faulty memory address f-addr rather than addr, thus changing the state of memory while it is not supposed to do so (as shown in the lower part of FIG. 4). This error remains undetectable, since the following checking-load instruction will load the value, val, from the correct address (computed by the detection stream), $addr^D$, which is equal to $val^M$ and $val^D$. Note that simply inserting a check for the base address register store would not solve the problem since the error can alter the store address without affecting the address register (e.g., errors affecting functional unit or pipeline register while processing the store instruction). Since silent stores can consist of around 18% to 64% of the total program's store instructions, fixing the silent store vulnerability is important in critical applications.

Figures 5A, 5B:
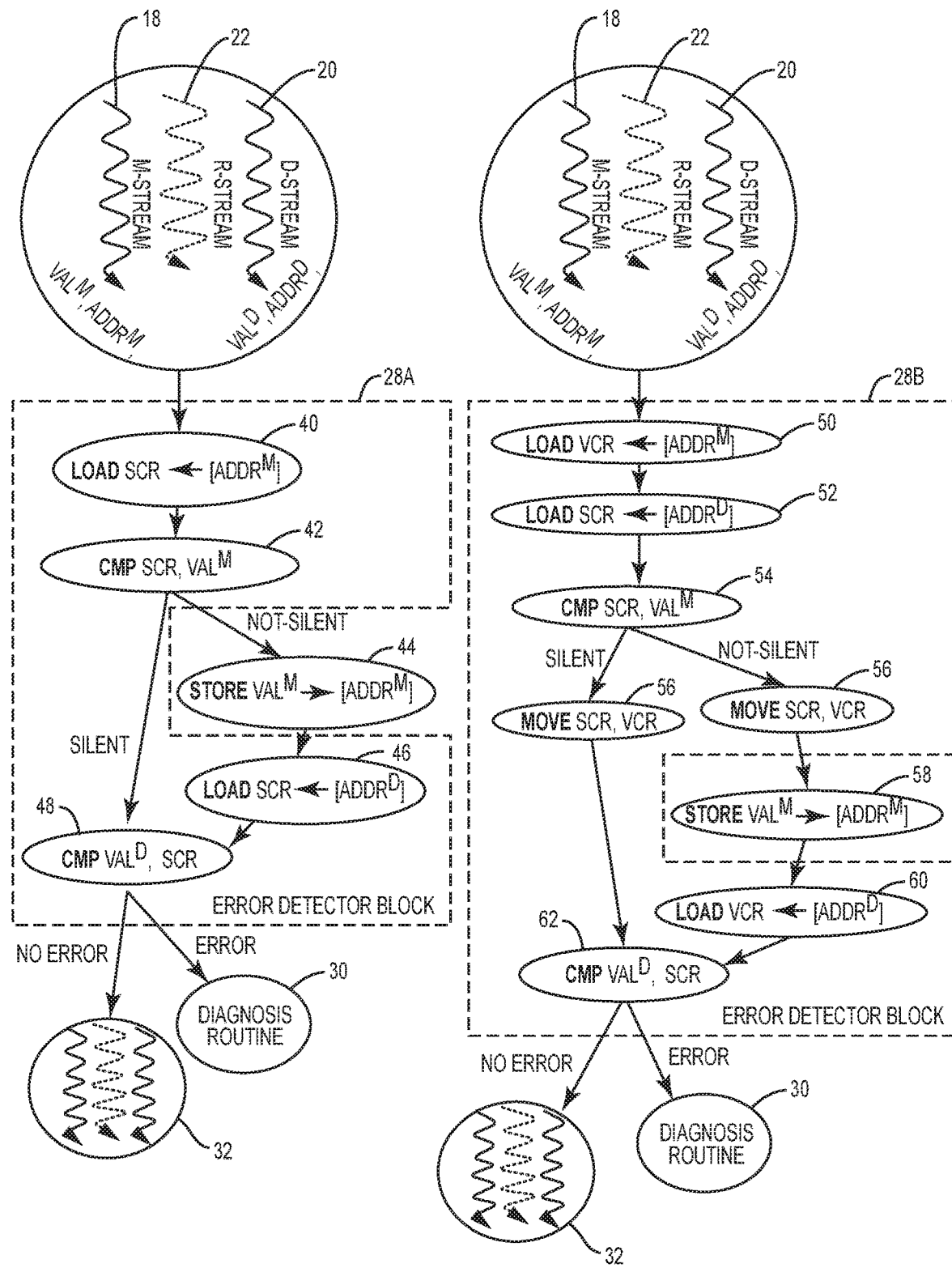
FIG. 5A is a schematic diagram providing an exemplary illustration of the method of FIG. 2 configured according to an embodiment of the present disclosure to detect the silent-store error in FIG. 4.
FIG. 5B is a schematic diagram providing an exemplary illustration of the method of FIG. 2 configured according to another embodiment of the present disclosure to detect the silent-store error in FIG. 4.

The process 10 of FIG. 2 and, more specifically, the error detector block 28 in FIG. 3, can be configured to effectively detect and thereby react to the so-called silent-store error as discussed above. In this regard, FIG. 5A is a schematic diagram providing an exemplary illustration of the process 10 of FIG. 2 configured according to an embodiment of the present disclosure to detect the silent-store error in FIG. 4. Common elements between FIGS. 3 and 5A are shown therein with common element numbers and will not be re-described herein.

The software compiler may be configured to generate an error detector block 28A that is functionally equivalent to the error detector block 28 in FIG. 3. The error detector block 28A may load a value stored at a destination address $[ADDR^M]$, which is associated with the memory write instruction (e.g., load), into a silent check register (SCR) (block 40). Next, the error detector block 28A compares the SCR with a master value $VAL^M$ computed by the master instruction sequence 18 and stored in the master register $R^M$ to determine whether the silent-store error exists (block 42). If the silent-store error does not exist, the error detector block 28A writes the master value $VAL^M$ to the destination address $[ADDR^M]$ as stored in the SCR (block 44). Notably, the error decoder block 28A may invoke one or more external instructions (e.g., not as part of the error decoder block 28A) to write the master value $VAL^M$ to the destination address $[ADDR^M]$. The error detector block 28A then loads a value stored at a detection destination address $[ADDR^D]$ into the SCR (block 46). Regardless of whether the silent-store error exists, the error detector block 28A proceeds to comparing the SCR with a detection value $VAL^D$ computed by the detection instruction sequence 20 and stored in the detection register $R^D$ to detect the soft error associated with executing the memory write instruction (block 48).

FIG. 5B is a schematic diagram providing an exemplary illustration of the process 10 of FIG. 2 configured according to another embodiment of the present disclosure to detect the silent-store error in FIG. 4. Common elements between FIGS. 3 and 5B are shown therein with common element numbers and will not be re-described herein.

The software compiler may be configured to generate an error detector block 28B that is functionally equivalent to the error detector block 28 in FIG. 3. The error detector block 28B may load a value stored at a destination address $[ADDR^M]$, which is associated with the master instruction sequence 18, into a value check register (VCR) (block 50). The error detector block 28B may load a value stored at a destination address $[ADDR^D]$, which is associated with the detection instruction sequence 20, into a silent check register (SCR) (block 52). Next, the error detector block 28B compares the SCR with a master value $VAL^M$ computed by the master instruction sequence 18 and stored in the master register $R^M$ to determine whether the silent-store error exists (block 54). Regardless of whether the silent-store error exists, the error detector block 28B copies the SCR to the VCR (block 56). If the silent-store error does not exist, the error detector block 28B writes the master value $VAL^M$ to the destination address $[ADDR^M]$ as stored in the VCR (block 58). Notably, the error decoder block 28B may invoke one or more external instructions (e.g., not as part of the error decoder block 28B) to write the master value $VAL^M$ to the destination address $[ADDR^M]$. The error detector block 28B then loads a value stored at a detection destination address $[ADDR^D]$ into the VCR (block 60). Regardless of whether the silent-store error exists, the error detector block 28B proceeds to comparing the SCR with a detection value $VAL^D$ computed by the detection instruction sequence 20 and stored in the detection register $R^D$ to detect the soft error associated with executing the memory write instruction (block 62).

FIG. 6 is a schematic diagram providing an exemplary illustration of the process 10 of FIG. 2 configured to detect a wrong-direction control flow error associated with execution of a flow control instruction 64. Common elements between FIGS. 3 and 6 are shown therein with common element numbers and will not be re-described herein.

The flow control instruction 64 determines a true-condition branch 66T (denoted as "TAKEN") and a false-condition branch 66F (denoted as "NOT-TAKEN") based on a predefined branching condition (e.g., a≥b, a≤b, etc.). In examples discussed herein, the flow control instruction 64 compares a first master value $VAL1^M$ stored in a first master register $R1^M$ (not shown) and a second master value $VAL2^M$ stored in a second master register $R2^M$ (not shown) to determine the true-condition branch 66T, which corresponds to satisfaction of the predefined branching condition, and the false-condition branch 66F, which corresponds to dissatisfaction of the predefined branching condition. Notably, a soft error occurring during execution of the flow control instruction 64 may cause the flow control instruction 64 to suffer the wrong-direction control flow error. For example, the flow control instruction 64 may mistakenly cause a program to proceed to the true-condition branch 66T even though the predefined branching condition is actually dissatisfied, or vice versa. As such, it may be desired to detect and react to the wrong-direction control flow error that may occur during execution of the flow control instruction 64.

In this regard, the software compiler may be configured to generate an error detector block 28C, which is functionally equivalent to the error detector block 28 in FIG. 3, immediately after the flow control instruction 64. In a non-limiting example, the error detector block 28C includes a true-condition error detector block 68T and a false-condition error detector block 68F. The true-condition error detector block 68T is configured to compare a first detection value $VAL1^D$ stored in a first detection register $R1^D$ (not shown) and a second detection value $VAL2^D$ stored in a second detection register $R2^D$ (not shown) based on an opposite of the predefined branching condition to detect the wrong-direction control flow error. For example, if the predefined branching condition is a≥b, then the opposite of the predefined branching condition will be a<b. In contrast, the false-condition error detector block 68F is configured to compare the first detection value $VAL1^D$ stored in the first detection register $R1^D$ and the second detection value $VAL2^D$ stored in the second detection register $R2^D$ based on the predefined branching condition to detect the wrong-direction control flow error. If the wrong-direction control flow error is detected in the true-condition branch 66T or the false-condition branch 66F, the error detector block 28C may invoke the diagnosis routine 30 (not shown) to react to the wrong-direction control flow error. If the wrong-direction control flow error is not detected in both the true-condition branch 66T and the false-condition branch 66F, the true-condition error detector block 68T and the false-condition error detector block 68F can cause the execution to proceed to a true-condition base block 70T and a false-condition base block 70F, respectively.

In a non-limiting example, there can be a second flow control instruction 72 in execution, either concurrent to or independent of, the flow control instruction 64. The second flow control instruction 72 determines a second true-condition branch 74T (denoted as "TAKEN") and a second false-condition branch 74F (denoted as "NOT-TAKEN") based on a second predefined branching condition. In examples discussed herein, the second flow control instruction 72 compares a third master value $VAL3^M$ stored in a third master register $R3^M$ (not shown) and a fourth master value $VAL4^M$ stored in a fourth master register $R4^M$ (not shown) to determine the second true-condition branch 74T, which corresponds to satisfaction of the second predefined branching condition, and the second false-condition branch 74F, which corresponds to dissatisfaction of the second predefined branching condition. Notably, a soft error occurring during execution of the second flow control instruction 72 may cause the second flow control instruction 72 to suffer the wrong-direction control flow error.

In a non-limiting example, the error detector block 28C may include a second true-condition error detector block 76T and a second false-condition error detector block 76F. The second true-condition error detector block 76T is configured to compare a third detection value $VAL3^D$ stored in a third detection register $R3^D$ (not shown) and a fourth detection value $VAL4^D$ stored in a fourth detection register $R4^D$ (not shown) based on an opposite of the second predefined branching condition to detect the wrong-direction control flow error. In contrast, the second false-condition error detector block 76F is configured to compare the third detection value $VAL3^D$ stored in the third detection register $R1^D$ and the fourth detection value $VAL4^D$ stored in the fourth detection register $R4^D$ based on the second predefined branching condition to detect the wrong-direction control flow error. If the wrong-direction control flow error is detected in the second true-condition branch 74T or the second false-condition branch 74F, the error detector block 28C may invoke the diagnosis routine 30 to react to the wrong-direction control flow error. If the wrong-direction control flow error is not detected in both the second true-condition branch 74T and the second false-condition branch 74F, the second true-condition error detector block 76T and the second false-condition error detector block 76F can cause the execution to proceed to the true-condition base block 70T and a second false-condition base block 78F, respectively.

Notably, the false-condition base block 70F is a single-entry base block since the execution can only arrive at the false-condition base block 70F via the false-condition branch 66F. Likewise, the second false-condition base block 78F is also a single-entry base block since the execution can only arrive at the second false-condition base block 78F via the second false-condition branch 74F. In contrast, the true-condition base block 70T is a multi-entry base block (also referred to as "fan-in" base block) because the execution can arrive at the true-condition base block 70T via the true-condition branch 66T and the second true-condition branch 74T. In this regard, the error detector block 28C may be effective in detecting the wrong-direct control flow error in the context of single-entry base block and the fan-in base block.

FIG. 7 is a schematic diagram of an exemplary computer system 80 including one or more non-transitory computer-readable media 82(1)-82(4) for storing software instructions to implement the process 10 of FIG. 2. The non-transitory computer-readable media 82(1)-82(4) further include a hard drive 82(1), an on-board memory system 82(2), a compact disc 82(3), and a floppy disk 82(4). Notably, the computer system 80 may include additional storage media such as flash memory, non-volatile memory, cache memory, and so on. Each of the non-transitory computer-readable media 82(1)-82(4) may be configured to store the software instructions to implement the process 10.

The computer system 80 also includes a keyboard 84 and a computer mouse 86 for inputting the software instructions onto the non-transitory computer-readable media 82(1)-82(4). The keyboard 84 and the computer mouse 86 may also be used to input parameters of the software compiler for generating the error detector block 28 in the executable program 24 of FIG. 3 according to the process 10.

The computer system 80 also includes a monitor 88 for providing an indication of unrecoverable soft error as determined by the diagnosis routine 30 in FIG. 3. Further, the computer system 80 includes a processor 90 configured to read the software instructions from the non-transitory computer-readable media 82(1)-82(4) and execute the software instructions to implement the process 10. While the computer system 80 is illustrated as a single device, the computer system 80 may also be a computer network deployed according to a centralized topology or a distributed topology.

Those skilled in the art will recognize improvements and modifications to the preferred embodiments of the present disclosure. All such improvements and modifications are considered within the scope of the concepts disclosed herein and the claims that follow.

What is claimed is:

1. A method for detecting and recovery from soft errors in a computing device comprising:
   executing a predefined critical instruction;
   executing an error detector block subsequent to executing the predefined critical instruction to detect a soft error in the computing device, wherein executing the error detector block comprises:
      portioning a plurality of programmer-accessible registers in the computing device into at least one master register, at least one detection register, and at least one recovery register;
      generating the error detector block comprising:
         a master instruction sequence configured to operate on the at least one master register;
         a detection instruction sequence configured to operate on the at least one detection register; and
         a recovery instruction sequence configured to operate on the at least one recovery register; and
      executing sequentially the master instruction sequence, the detection instruction sequence, and the recovery instruction sequence after executing the predefined critical instruction to detect the soft error associated with executing the predefined critical instruction; and invoking a diagnosis routine and a recovery routine in response to detecting the soft error.

2. The method of claim 1 further comprising executing the error detector block to detect the soft error occurring during or prior to execution of the predefined critical instruction.

3. The method of claim 1 further comprising executing a software compiler to:
determine the predefined critical instruction;
generate the error detector block corresponding to the predefined critical instruction;
generate the diagnosis routine corresponding to the error detector block; and
generate an executable program comprising the predefined critical instruction, the error detector block, and the diagnosis routine.

4. The method of claim 1 further comprising:
generating the master instruction sequence comprising one or more master instructions selected from a group consisting of: an arithmetic instruction, a memory read instruction, a flow control instruction, a memory write instruction, and a functional call instruction;
generating the detection instruction sequence comprising one or more detection instructions selected from a group consisting of: the arithmetic instruction, the memory read instruction, and the flow control instruction; and
generating the recovery instruction sequence comprising one or more recovery instructions selected from a group consisting of: the arithmetic instruction and the memory read instruction.

5. The method of claim 1 further comprising invoking the diagnosis routine to:
determine whether the detected soft error is recoverable;
recover the detected soft error in response to determining that the detected soft error is a recoverable soft error; and
alert the detected soft error in response to determining that the detected soft error is a non-recoverable soft error.

6. The method of claim 5 further comprising performing majority-voting among the at least one master register, the at least one detection register, and the at least one recovery register to determine whether the soft error is recoverable.

7. The method of claim 1 further comprising detecting and reacting to a silent-store error occurring during execution of a memory write instruction.

8. The method of claim 7 further comprising:
loading a value stored at a destination address associated with the memory write instruction into a silent check register;
comparing the silent check register with a master value computed by the master instruction sequence and stored in the at least one master register to determine whether the silent-store error exists;
in response to determining that the silent-store error does not exist:
writing the master value stored in the at least one master register to the destination address stored in the silent check register; and
loading a value stored at a detection destination address into the silent check register;
comparing the silent check register with a detection value computed by the detection instruction sequence and stored in the at least one detection register to detect the soft error associated with executing the memory write instruction; and
invoking the diagnosis routine in response to detecting the soft error.

9. The method of claim 7 further comprising:
loading a value stored at a destination address associated with the memory write instruction into a value check register and a silent check register, respectively;
comparing the silent check register with a master value computed by the master instruction sequence and stored in the at least one master register to determine whether the silent-store error exists;
copying the silent check register to the value check register;
in response to determining that the silent-store error does not exist:
writing the master value stored in the at least one master register to the destination address stored in the value check register; and
loading a value stored at a detection destination address into the value check register;
comparing the silent check register with a detection value computed by the detection instruction sequence and stored in the at least one detection register to detect the soft error associated with executing the memory write instruction; and
invoking the diagnosis routine and a recovery routine in response to detecting the soft error.

10. The method of claim 1 further comprising detecting and reacting to a wrong-direction control flow error occurring during execution of a flow control instruction.

11. The method of claim 10 further comprising:
executing the flow control instruction based on a predefined branching condition to determine a true-condition branch and a false-condition branch;
in the true-condition branch, comparing a first detection register and a second detection register among the at least one detection register based on an opposite of the predefined branching condition to detect the wrong-direction control flow error;
in the false-condition branch, comparing the first detection register and the second detection register among the at least one detection register based on the predefined branching condition to detect the wrong-direction control flow error; and
invoking the diagnosis routine in response to detecting the wrong-direction control flow error.

12. A non-transitory computer-readable medium (CRM) comprising software with instructions configured to:
execute a predefined critical instruction;
execute an error detector block subsequent to executing the predefined critical instruction to detect a soft error in a computing device, wherein executing the error detector block comprises:
portioning a plurality of programmer-accessible registers in the computing device into at least one master register, at least one detection register, and at least one recovery register;
generating the error detector block comprising:
a master instruction sequence configured to operate on the at least one master register;
a detection instruction sequence configured to operate on the at least one detection register; and
a recovery instruction sequence configured to operate on the at least one recovery register; and
executing sequentially the master instruction sequence, the detection instruction sequence, and the recovery instruction sequence after executing the predefined critical instruction to detect the soft error associated with executing the predefined critical instruction; and invoke a diagnosis routine in response to detecting the soft error.

13. The non-transitory CRM of claim 12 wherein the software with instructions is further configured to execute the error detector block to detect the soft error occurring during or prior to execution of the predefined critical instruction.

14. The non-transitory CRM of claim 12 wherein the software with instructions is further configured to execute a software compiler to:
   determine the predefined critical instruction;
   generate the error detector block corresponding to the predefined critical instruction;
   generate the diagnosis routine corresponding to the error detector block; and
   generate an executable program comprising the predefined critical instruction, the error detector block, and the diagnosis routine.

15. The non-transitory CRM of claim 12 wherein the software with instructions is further configured to:
   generate the master instruction sequence comprising one or more master instructions selected from a group consisting of: an arithmetic instruction, a memory read instruction, a flow control instruction, a memory write instruction, and a functional call instruction;
   generate the detection instruction sequence comprising one or more detection instructions selected from a group consisting of: the arithmetic instruction, the memory read instruction, and the flow control instruction; and
   generate the recovery instruction sequence comprising one or more recovery instructions selected from a group consisting of: the arithmetic instruction and the memory read instruction.

16. The non-transitory CRM of claim 12 wherein the software with instructions is further configured to invoke the diagnosis routine to:
   determine whether the detected soft error is recoverable;
   recover the detected soft error in response to determining that the detected soft error is a recoverable soft error; and
   alert the detected soft error in response to determining that the detected soft error is a non-recoverable soft error.

17. The non-transitory CRM of claim 16 wherein the software with instructions is further configured to perform majority-voting among the at least one master register, the at least one detection register, and the at least one recovery register to determine whether the soft error is recoverable.

18. The non-transitory CRM of claim 12 wherein the software with instructions is further configured to detect and react to a silent-store error occurring during execution of a memory write instruction.

19. The non-transitory CRM of claim 18 wherein the software with instructions is further configured to:
   load a value stored at a destination address associated with the memory write instruction into a silent check register;
   compare the silent check register with a master value computed by the master instruction sequence and stored in the at least one master register to determine whether the silent-store error exists;
   in response to determining that the silent-store error does not exist:
      write the master value stored in the at least one master register to the destination address stored in the silent check register; and
      load a value stored at a detection destination address into the silent check register;
   compare the silent check register with a detection value computed by the detection instruction sequence and stored in the at least one detection register to detect the soft error associated with executing the memory write instruction; and
   invoke the diagnosis routine in response to detecting the soft error.

20. The non-transitory CRM of claim 18 wherein the software with instructions is further configured to:
   load a value stored at a destination address associated with the memory write instruction into a value check register and a silent check register, respectively;
   compare the silent check register with a master value computed by the master instruction sequence and stored in the at least one master register to determine whether the silent-store error exists;
   copy the silent check register to the value check register;
   in response to determining that the silent-store error does not exist:
      write the master value stored in the at least one master register to the destination address stored in the value check register; and
      load a value stored at a detection destination address into the value check register;
   compare the silent check register with a detection value computed by the detection instruction sequence and stored in the at least one detection register to detect the soft error associated with executing the memory write instruction; and
   invoke the diagnosis routine in response to detecting the soft error.

21. The non-transitory CRM of claim 12 wherein the software with instructions is further configured to detect and react to a wrong-direction control flow error occurring during execution of a flow control instruction.

22. The non-transitory CRM of claim 21 wherein the software with instructions is further configured to:
   execute the flow control instruction based on a predefined branching condition to determine a true-condition branch and a false-condition branch;
   in the true-condition branch, compare a first detection register and a second detection register among the at least one detection register based on an opposite of the predefined branching condition to detect the wrong-direction control flow error;
   in the false-condition branch, compare the first detection register and the second detection register among the at least one detection register based on the predefined branching condition to detect the wrong-direction control flow error; and
   invoke the diagnosis routine in response to detecting the wrong-direction control flow error.

* * * * *